US008433475B2

(12) United States Patent
Corbefin

(10) Patent No.: US 8,433,475 B2
(45) Date of Patent: Apr. 30, 2013

(54) MAINTENANCE COMPUTER SYSTEM FOR AN AIRCRAFT

(75) Inventor: Jean-Philippe Corbefin, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 632 days.

(21) Appl. No.: 12/663,351

(22) PCT Filed: Jun. 5, 2008

(86) PCT No.: PCT/EP2008/056970
§ 371 (c)(1),
(2), (4) Date: Dec. 7, 2009

(87) PCT Pub. No.: WO2008/155227
PCT Pub. Date: Dec. 24, 2008

(65) Prior Publication Data
US 2010/0198431 A1 Aug. 5, 2010

(30) Foreign Application Priority Data

Jun. 15, 2007 (FR) .................................. 07 55789

(51) Int. Cl.
G06F 11/30 (2006.01)
H04L 29/06 (2006.01)
G06F 11/07 (2006.01)
G06F 19/00 (2011.01)

(52) U.S. Cl.
USPC ............ 701/34.2; 701/3; 701/31.8; 701/32.9; 701/33.4; 701/34.4

(58) Field of Classification Search ................ 701/3–18, 701/29.1–34.4
See application file for complete search history.

(56) References Cited

U.S. PATENT DOCUMENTS

| 6,115,656 | A | * | 9/2000 | Sudolsky | 701/33.4 |
| 6,574,537 | B2 | * | 6/2003 | Kipersztok et al. | 701/31.8 |
| 2003/0167111 | A1 | * | 9/2003 | Kipersztok et al. | 701/29 |
| 2003/0204556 | A1 | * | 10/2003 | Bernard | 709/200 |
| 2005/0028033 | A1 | * | 2/2005 | Kipersztok et al. | 714/27 |
| 2005/0149238 | A1 | * | 7/2005 | Stefani et al. | 701/33 |

(Continued)

FOREIGN PATENT DOCUMENTS

WO  WO 03/102705 A1  12/2003

OTHER PUBLICATIONS

Patricia M. McCown, et al., "Auxiliary Power Unit Maintenance Aid—Flight Line Engine Diagnostics", Autotestcon '89 Conference Record, XP010079548, Sep. 25, 1989, pp. 296-301.

(Continued)

Primary Examiner — Khoi Tran
Assistant Examiner — Dale Moyer
(74) Attorney, Agent, or Firm — Oblon, Spivak, McClelland, Maier & Neustadt, L.L.P.

(57) ABSTRACT

A maintenance computer system for an aircraft, including a network partitioned into a secured avionics zone and an open zone. The system includes a first software module accommodated in the avionics zone and a second software module accommodated in the open zone, the first module configured to follow a fault-finding logic tree, and the second module configured to present an electronic maintenance document, with the path along the fault-finding logic tree followed by the first module automatically and synchronously generating a presentation by the second module of pages of the maintenance document associated respectively with nodes of the tree.

9 Claims, 11 Drawing Sheets

U.S. PATENT DOCUMENTS

| | | | |
|---|---|---|---|
| 2005/0165939 A1* | 7/2005 | Nikunen et al. | 709/230 |
| 2006/0112119 A1* | 5/2006 | Vian et al. | 707/101 |
| 2007/0033277 A1* | 2/2007 | Yukawa et al. | 709/224 |
| 2007/0127460 A1* | 6/2007 | Wilber et al. | 370/389 |
| 2007/0183435 A1* | 8/2007 | Kettering et al. | 370/401 |
| 2009/0265056 A1* | 10/2009 | Yukawa et al. | 701/29 |
| 2010/0042283 A1* | 2/2010 | Kell et al. | 701/29 |
| 2010/0152924 A1* | 6/2010 | Pandit et al. | 701/3 |
| 2011/0040441 A1* | 2/2011 | Gaudan et al. | 701/30 |

OTHER PUBLICATIONS

Philip A. Scandura, Jr., "Integrated Vehicle Health Management as a System Engineering Discipline", Digital Avionics Systems Conference, XP010868345, Oct. 30, 2005, pp. (7.D.1-1)-(7.D.1-10).

R. Wayne Dixon, et al., "Demonstration of an SLI Vehicle Health Management System With In-flight and Ground-based Subsystem Interfaces", IEEE, Aerospace Conference, vol. 2-887, XP010661070, Mar. 8, 2003, pp. 1-14.

Anonymous, "Diagnostics hyperlink to online service manual", Research Disclosure, vol. 469, No. 19, XP007132578, May 2003, 2 pages.

Carl Lloyd, "Document Engineering", Conference Proceedings Article, XP006523811, 1990, pp. 7/1-7/6.

William G. Fenton, et al., "Fault Diagnosis of Electronic Systems Using Intelligent Techniques: A Review", IEEE Transactions on Systems, Man, and Cybernetics—Part C: Applications and Reviews, vol. 31, No. 3, XP011057254, Aug. 2001, pp. 269-281.

* cited by examiner

FIG. 5A

MAINTENANCE COMPUTER SYSTEM FOR AN AIRCRAFT

TECHNICAL FIELD

This present invention generally concerns the field of aircraft maintenance.

STATE OF THE PRIOR ART

Traditionally, the maintenance of an aircraft is effected on the ground by maintenance technicians on the basis of paper documents.

These documents have previously taken the form of maintenance and repair manuals or folders, respectively known by the acronyms AMM (Aircraft Maintenance Manual) and TSM (TroubleShooting or faultfinding Manual). These documents provided an exhaustive description of the procedures for preventive maintenance, as well as detection and repair of the faults that can affect any equipment on the aircraft.

In a similar manner, the comments of the pilots were recorded in an on-board record called the "flight logbook" also in paper form. The maintenance technicians then used this logbook for maintenance purposes during stopovers.

More recently, with the tendency to reduce or even eliminate all paper in the cockpit (The Less Paper Cockpit), the AMM and TSM manuals and the flight logbook have been replaced by aircraft-mounted computer applications.

More precisely, the AMM and TSM manuals now come in the form of electronic documents in which the maintenance operator is able to browse freely by virtue of hyperlinks. These documents contain a description of the equipment in the aircraft, and of the faults that can affect it, enabling the maintenance operator to identify and clear the fault.

Similarly, the flight logbook also takes the form of an electronic document, called the "eLogbook".

The aforementioned electronic documents are also linked together by means of hyperlinks, so that the operator can easily pass from one application to the other.

In addition, a centralised maintenance system (CMS for short), is used to run the testing of a distant equipment item when the latter is equipped with a built-in test equipment (BITE for short) module, as well as to any error messages and to correlate these with each other or with faults so as to facilitate the fault-finding process.

The maintenance operator therefore has at his disposal a variety of disparate computer tools that he has to master in order to be able to find faults and clear any failures.

However, these maintenance tools come with a certain number of drawbacks.

To begin with, the operator is not always guided in his fault-finding efforts. He is free to follow the procedure that seems to him to be most appropriate and, where necessary, to skip some test steps or even to reverse the order indicated in the manual, with the risk of a more or less fast convergence according to the options that were chosen.

Next, in the planes of recent design, due to the partition of the on-board network into a secured zone and an unsecured zone, it is difficult to ascertain where the computer applications relating to maintenance are accommodated. More precisely, the on-board network is generally partitioned into two sub-networks, the first located in a so-called avionics zone, and the second in so-called open or unsecured zone. The links between the two sub-networks are necessarily unidirectional, leading from the avionics sub-network to the open sub-network. On the other hand, within any given sub-network, the links can be bidirectional.

The accommodation of the maintenance tools in the open zone cannot provide a guarantee of their integrity, or in other words to effectively guard against malicious access and/or corruption of the programs and data that constitute them. As a consequence, the maintenance tools are not suitable to be the subject of any certification process. Moreover, any incorrect use of the maintenance tools (unplanned or inconsistent tests) could be prejudicial to the correct operation of the systems in the avionics zone.

Conversely, accommodation of these tools in an avionics zone can hardly be envisaged since it would require development of specific and very costly applications, thus eliminating the option of performing frequent updates.

One aim of this present invention is to propose a maintenance tool for an aircraft that does not exhibit the foregoing drawbacks, meaning one that firstly always provides a guide for the operator, and secondly makes possible an implementation that is compatible with the partitioning of the on-board network.

PRESENTATION OF THE INVENTION

This present invention concerns a maintenance computer system for an aircraft, equipped with a network that is partitioned into a secured zone, referred to as the avionics zone, and an open zone, with the said computer system having a first software module accommodated in the avionics zone and a second software module accommodated in the open zone, the first module being designed to follow fault-finding logic tree, and the second module being designed to present an electronic maintenance document, with the path along the fault-finding logic tree by the first module automatically and synchronously generating the presentation by the second module of pages of the said maintenance document associated respectively with the nodes concerned.

Advantageously, each node of the said fault-finding logic tree corresponds to at least one maintenance task and the first module transmits to the second module a hyperlink pointing to a page of the maintenance document associated with this task when the first module reaches the said node.

The first module typically determines the next node as a function of the result of executing the said maintenance task corresponding to this node.

The fault-finding logic tree is determined, for example, from a fault identifier code, the said code itself being obtained from the analysis of an entry in an electronic flight logbook accommodated in the avionics zone.

If the first module determines that an equipment item in the aircraft is faulty on completing its run through the fault-finding logic tree, the said system can be designed to verify the presence of this equipment in a minimum equipment list (MEL for short) of the aircraft, held in the avionics zone.

If the said faulty equipment item is present in the MEL, the system is designed to calculate the corresponding cost in terms of loss of functional performance or safety margins of the aircraft.

It is also possible to provide a third software module, accommodated in the avionics zone, and a fourth software module, accommodated in the open zone, the third module being designed to seek and select the elements of the MEL, with the fourth software module presenting document pages corresponding to the said equipment, with the selection of an element by the said third software module automatically and synchronously generating the presentation by the fourth module of a document page relating to this element.

For each element of the MEL, the third module advantageously transmits to the fourth module, a hyperlink pointing to a URL containing the said document page relating to this element.

The first module, and where appropriate the third module, can be accommodated in a first computer in the avionics zone, and the second module, and the fourth module where appropriate, can be accommodated in a second computer in the open zone, with the second computer then being linked to the part of the network in the avionics zone by a unidirectional link to the open zone and a wireless access point.

According to a variant, the first module, and where appropriate the third module, can be accommodated in a first computer in the avionics zone and the second module, and the fourth module where appropriate, can be accommodated in a second computer in the open zone, with the inputs/outputs of the first and second computers being linked to a KVM switch, the said switch being designed to switch the said inputs/outputs to common input/output interface.

BRIEF DESCRIPTION OF THE DRAWINGS

Other characteristics and advantages of the invention will appear on reading the description that follows of one preferred method of implementation of the invention, provided with reference to the attached figures and including:

FIGS. 5A to 5G respectively representing the content of a first screen and a second screen of the maintenance system, during the progression of the fault-finding module along successive nodes of the fault-finding logic tree.

DETAILED PRESENTATION OF PARTICULAR IMPLEMENTATION METHODS

The fundamental idea of the invention is to provide a maintenance system with a first software module accommodated in the avionics zone and a second software module accommodated in the open zone, the first being a fault-finding module designed to follow a logic path in a fault-finding logic tree and the second being dedicated to presenting the maintenance document, with the encountering of nodes in the fault-finding logic tree automatically and synchronously generating the presentation of the document pages associated respectively with the nodes concerned.

Figure 1:
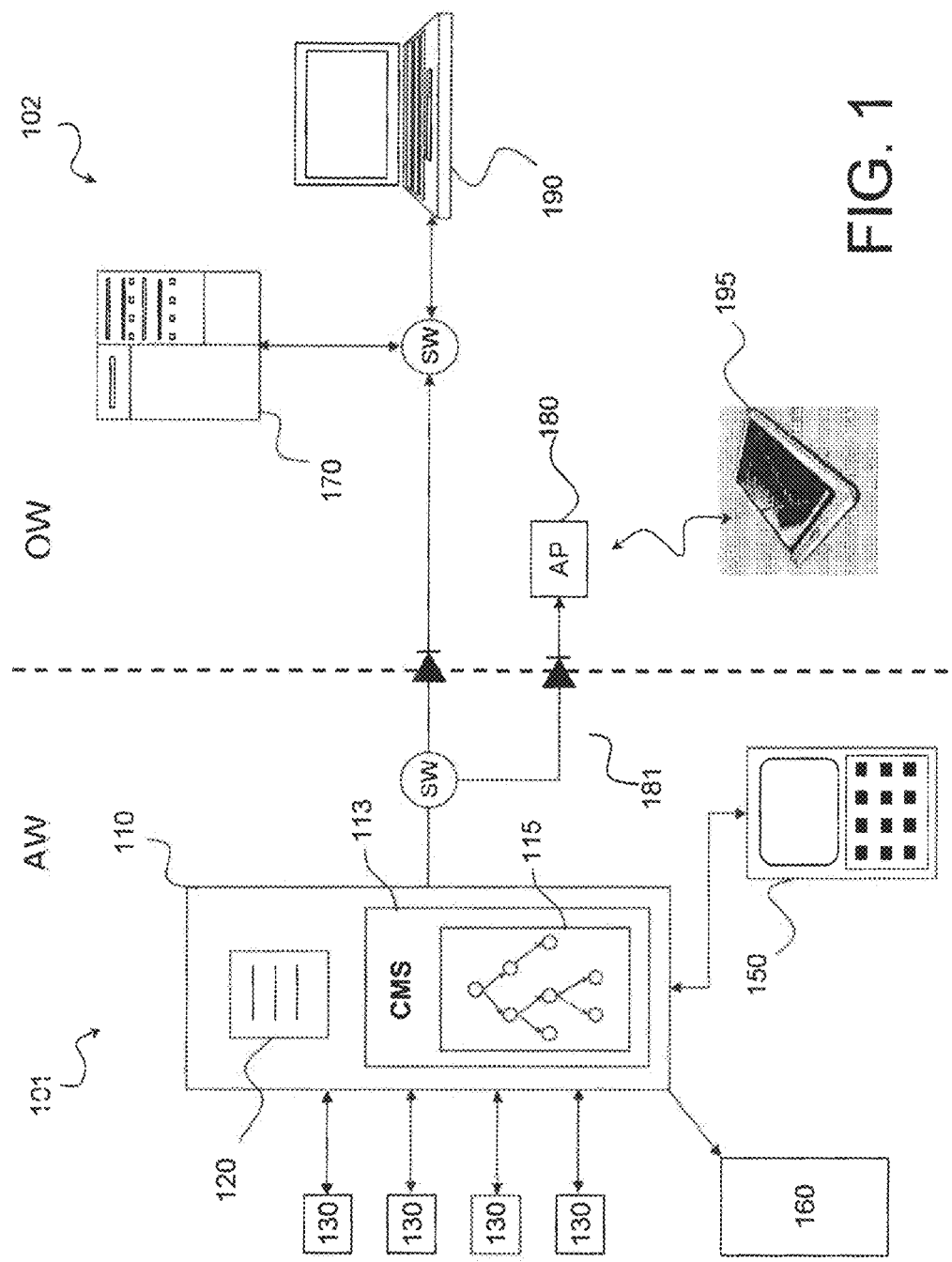
FIG. 1 diagrammatically illustrating a first method of implementation of the maintenance system according to the invention.

FIG. 1 illustrates a maintenance computer system according to one method of implementation of the invention.

The system is composed of two parts, 101 and 102, respectively held in the avionics zone (AW) and the open zone (OW). Each of the parts of the system includes a variety of equipment linked together by virtue of bidirectional links, such as virtual links in a switched Ethernet network. On the other hand, the two parts are only linked together by one or more unidirectional links leading from the AW zone to the OW zone, symbolised in the figure by diodes.

The part in the avionics zone includes an onboard Maintenance Terminal (OMT—110) housing a Centralised Maintenance System (CMS—113). This system in particular includes a first software module, called the fault-finding module (115), designed to follow a predetermined fault-finding logic tree. The OMT also houses a software module (120), which is responsible for management of the flight logbook. The OMT is also linked to built-in test modules (130), implemented in certain equipment to be tested, and to a unit (160) that is responsible for controlling all of the circuit-breakers associated with this equipment. The operation of a circuit-breaker is used to cut the power to one or more items of equipment so that it can be replaced in total safety. Finally, the OMT terminal possesses an input/output interface (150) that in particular has a display screen and a keyboard.

The part of the system in the open zone includes a terminal that is used for consultation of the maintenance document, hereinafter called the information terminal. This terminal can, for example, take the form of a portable computer (190), or of and electronic notepad (Tablet PC™—195). The maintenance document is accommodated either directly in the portable computer (190) or in the electronic notepad (195) if its memory size is sufficiently small, or in an on-board server (170) otherwise. The portable computer or the electronic notepad can be linked by a wireless connection to the line network via an access point (AP). If the access point is connected to the avionics part of the network, this connection is effected by means of a unidirectional link (181), as indicated in the figure. Frame switches, denoted SW, are used for routing over the different links of the network.

Figure 2:
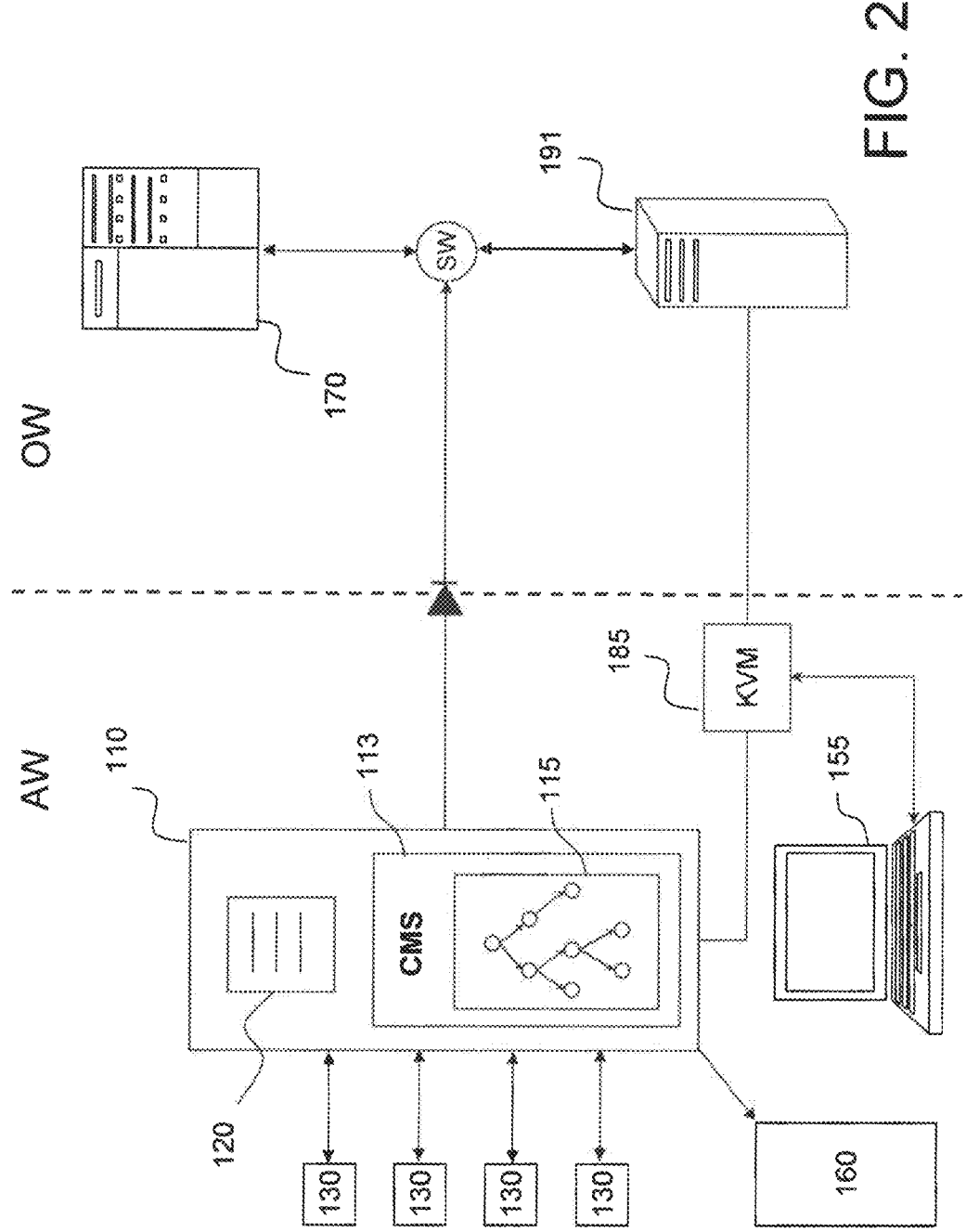
FIG. 2 diagrammatically illustrating an implementation variant of the maintenance system according to the invention.

According to a second method of implementation represented in FIG. 2, a common input/output interface (155) (keyboard, screen and mouse where appropriate) is shared between the computer (110) housing the fault-finding module and the computer (191) housing the maintenance document. The inputs/outputs of these computers are linked through the KVM (Keyboard Video Mouse) switch (185) to this common input/output interface, the said switch being used for switching, manually or automatically, between the two computers. It will be seen that only the video signal from the computer (191) travels from the open zone to the avionics zone so that the security of the latter is not affected. The maintenance operator can thus switch easily from the fault-finding screen to the document screen, as will be seen later.

In the event of a fault occurring, the CMS system is informed of the latter either directly by a message transmitted by the Flight Warning System (FWS), or by a comment from the pilot recorded as an entry in the flight logbook (120), or by the two jointly. The CMS system is able to perform a correlation between different faults so as to look for the common probable causes. In any event, the CMS system supplies an identifier code of a probable fault, together with one or more Line Replaceable Units (LRU).

The fault-finding module (115) receives a fault identifier code and retrieves the fault-finding logic tree corresponding to this code. The module (115) is designed to negotiate this fault-finding logic tree according to the indications supplied by the maintenance operator and/or the built-in test modules in the equipment to be checked. The fault-finding logic tree generally includes a first part relating to the confirmation of the fault and a second part relating to the clearance proper, in the event that the fault is actually confirmed.

Each node of the fault-finding logic tree includes a task or a series of tasks to be performed, the result of which determines the choice of the next node.

To each node of the fault-finding logic tree there corresponds a page of the maintenance document intended to be displayed on the information terminal (190 or 195). Following the fault-finding logic tree simultaneously and automatically leads to navigation through the pages of the documents associated with the nodes traversed. More precisely, each time a node is visited by the fault-finding module, a hyperlink is transmitted by the OMT terminal to the said terminal. The latter includes a navigation module that synchronises automatically in order to seek out the URL pointed to by the hyperlink. The corresponding page can be retrieved locally in the information terminal if the document is stored there or indeed if the said page is available in the cache memory, or again in the on-board server (170). Alternatively, the document page can be retrieved from a server on the ground.

The maintenance operator is thus guided automatically through the fault-finding procedure while still being able to consult the maintenance document relating to each of the stages of the procedure.

Storage of the maintenance document in the open zone facilitates the update operations. The latter can be effected, for example, by means of a data download method in accordance with the ARINC 615 protocol or by simple replacement of a memory chip. The update generally leaves the fault-finding logic tree unchanged, which guarantees the integrity of the maintenance system.

The fault-finding logic tree can be extracted from the existing maintenance document, that is from the aforementioned AMM and TSM manuals. More precisely, the fault-finding logic tree corresponds to the tree structure of the TSM manual. When a step in the repair procedure of a fault corresponds to a node of the tree structure of the TSM manual, this requires the execution of certain maintenance tasks from the AMM manual. In this case, the tree that constitutes these tasks is grafted locally to the aforementioned node. All of the nodes of the tree structure of the TSM manual to which the trees of the maintenance tasks relating to the nodes concerned are thus grafted, form the fault-finding logic tree.

If the AMM and TSM manuals take the form of documents in the XML or SGML format, the fault-finding logic tree will be obtained by deleting the visual representation elements such as the formatting elements, the pictures, the three-dimensional diagrams, and the animation scripts. These elements are moved to the document part. On the other hand, all the functional elements will be preserved in the fault-finding logic tree, in particular the hyperlinks that are used to run test applications, to download software to an equipment item, to operate or open a circuit-breaker, etc.

There is therefore firstly a fault-finding logic tree and secondly a purely documentary file, the two being in the XML or SGML format for example, but possessing separate DTDs. In addition, with each node of the fault-finding logic tree there is associated a hyperlink to a page of the document file.

The fault-finding logic tree and the document file can also be created in parallel, in condition however of conforming to their respective DTDs and the consistency of the hyperlinks between the two documents.

Figure 3:
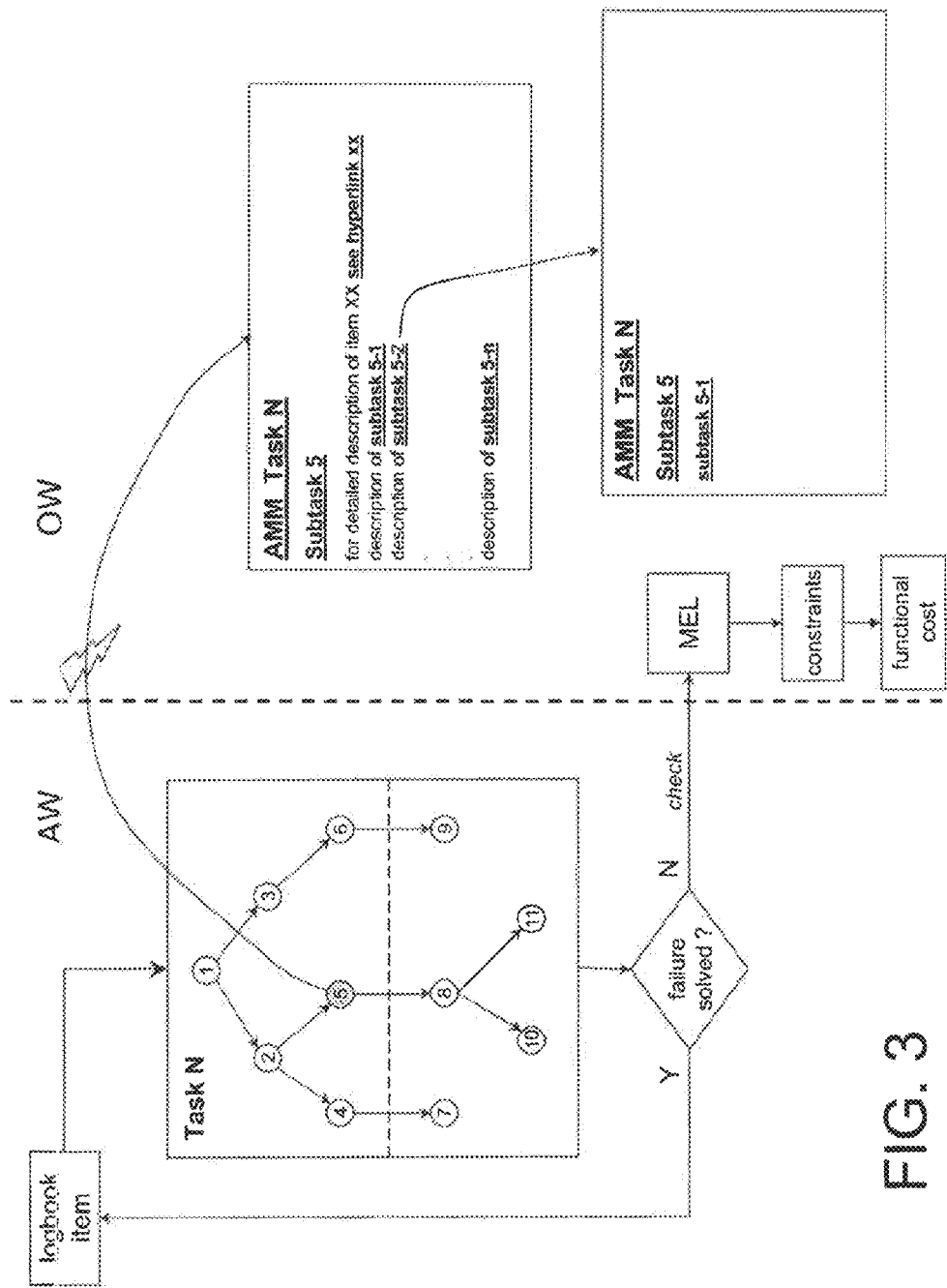
FIG. 3 illustrating the operation of the maintenance system according to the invention.

FIG. 3 illustrates an example of the operation of the maintenance computer system according to the invention.

A fault identifier code is transmitted to the fault-finding module, by an instruction from the flight logbook for example. The fault-finding module looks for the fault-finding logic tree (indicated here by "Task N") corresponding to this code. This tree is divided into two parts shown as I and II, corresponding respectively to the fault confirmation procedure and the fault clearance procedure.

During the path along the fault-finding logic tree, the presentation of the maintenance document is synchronised to the passage by each node of the tree. For example, when the fault-finding module passes by node 5, the document page relating to sub-task 5 is displayed on the information terminal. It is useful to note however that passage from one node to the next does not necessarily require a change of the page to be displayed. In addition, the maintenance operator can navigate as he wishes within the document by virtue of hyperlinks. For example, the operator can click on hyperlink "sub-task 5-2" in order to see the page relating to this sub-task. However, when the fault-finding module passes to the next node (in this case node 8), the document page relating to the latter node ("subtask 8") will be displayed automatically on the screen of the information terminal.

On completing its run through the fault-finding logic tree, either the fault is cleared, or the fault remains and the corresponding record is placed in the flight logbook. If the fault continues, the defective equipment is listed and compared with the content of the Minimum Equipment List (MEL). This list, contrary to what its name indicates, gives the list of equipment whose correct operation is optional for the operation of the appliance. Thus, if an equipment item identified as defective does not appear on the list, the flight must be cancelled. On the other hand, if an equipment item identified as defective is in the MEL, the system determines the constraints imposed by the malfunction of the equipment and the cost associated with this in terms of loss of functional performance or of safety margins. For example, the malfunction of an equipment item can impose a constraint on the quantity of fuel that the aircraft can take on, which in its turn determines a limit to its radius of operation. The aforementioned costs are stored in a file held in the avionics zone.

According to an implementation variant that is not represented, the computer system according to the invention includes a third software module, accommodated in the avionics zone, in the fault-finding terminal for example, allowing the pilot or the maintenance operator to look through MEL and to select any equipment item on this list. The computer system also includes a fourth software module, accommodated in the open zone, in the information terminal for example, responsible for displaying the document relating to the elements of the MEL. This document is held in the open zone, by the information terminal or the on-board server (170) for example. Alternatively, this document can be accommodated by a server on the ground. For its part, the MEL is held in the avionics zone, in the fault-finding terminal for example.

When an element of the MEL is selected by means of the third software module, it transmits, over the network to the fourth module, a hyperlink pointing to a URL that gives the document page relating to this element. The fourth software module then retrieves this page, and displays it on the screen of the information terminal. In this way, the following path along the elements of the MEL automatically and synchronously generates a presentation of the corresponding document pages by the information terminal.

Figure 4:
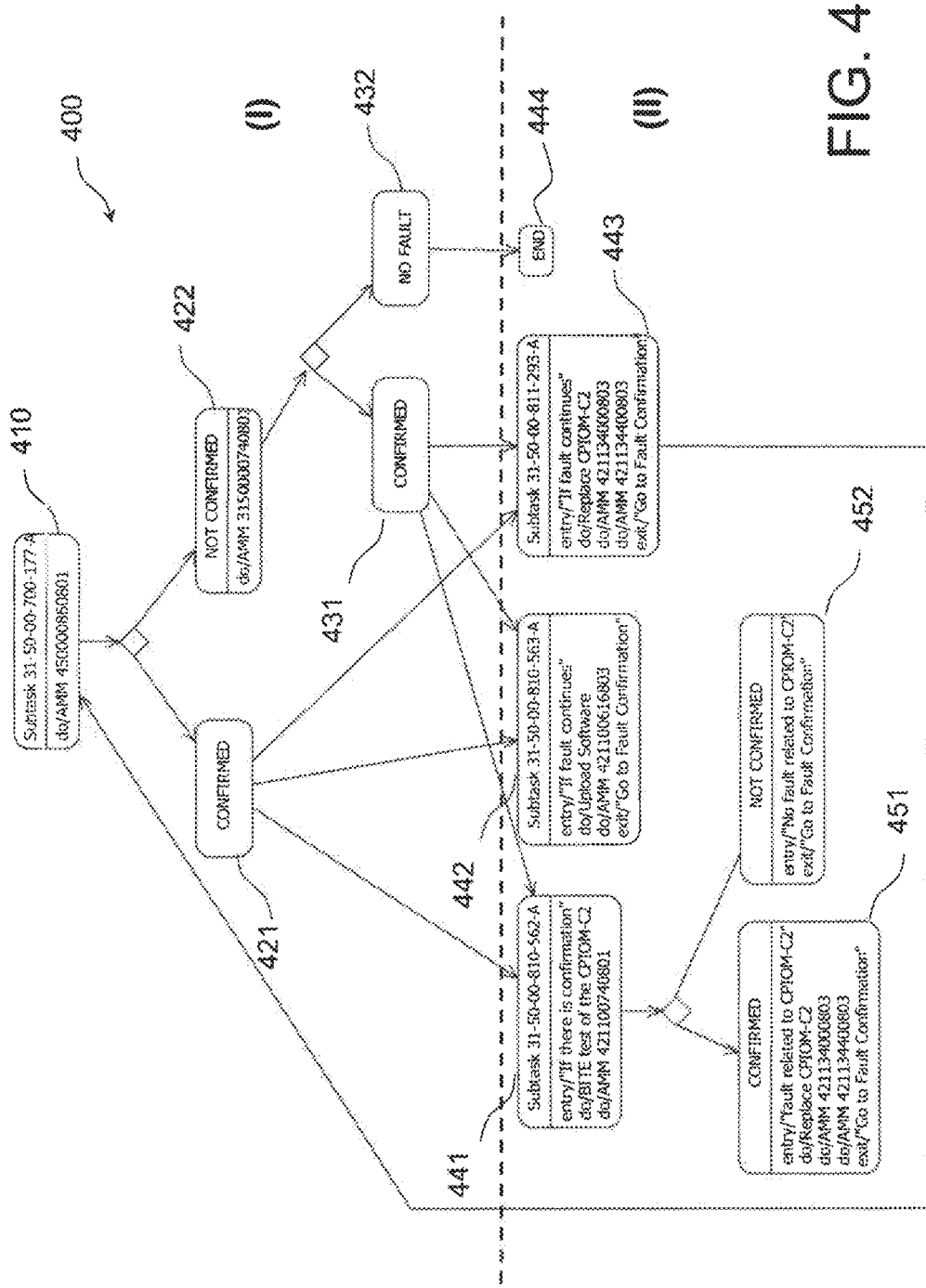
FIG. 4 giving an example of a fault-finding logic tree.

FIG. 4 gives an example of a fault-finding logic tree used by the fault-finding module (115), corresponding to a given fault code, here labelled TSM 31-50-810-982-A, corresponding to a fault in the software of a Flight Warning System (FWS 2). The part of the tree relating to the confirmation procedure and that relating to the isolation procedure are separated by a horizontal discontinuous line. FIGS. 5A to 5G show the content of the screens of the OMT terminal and of the information terminal for one example of a path through the fault-finding logic tree represented in FIG. 4.

Figure 5A:
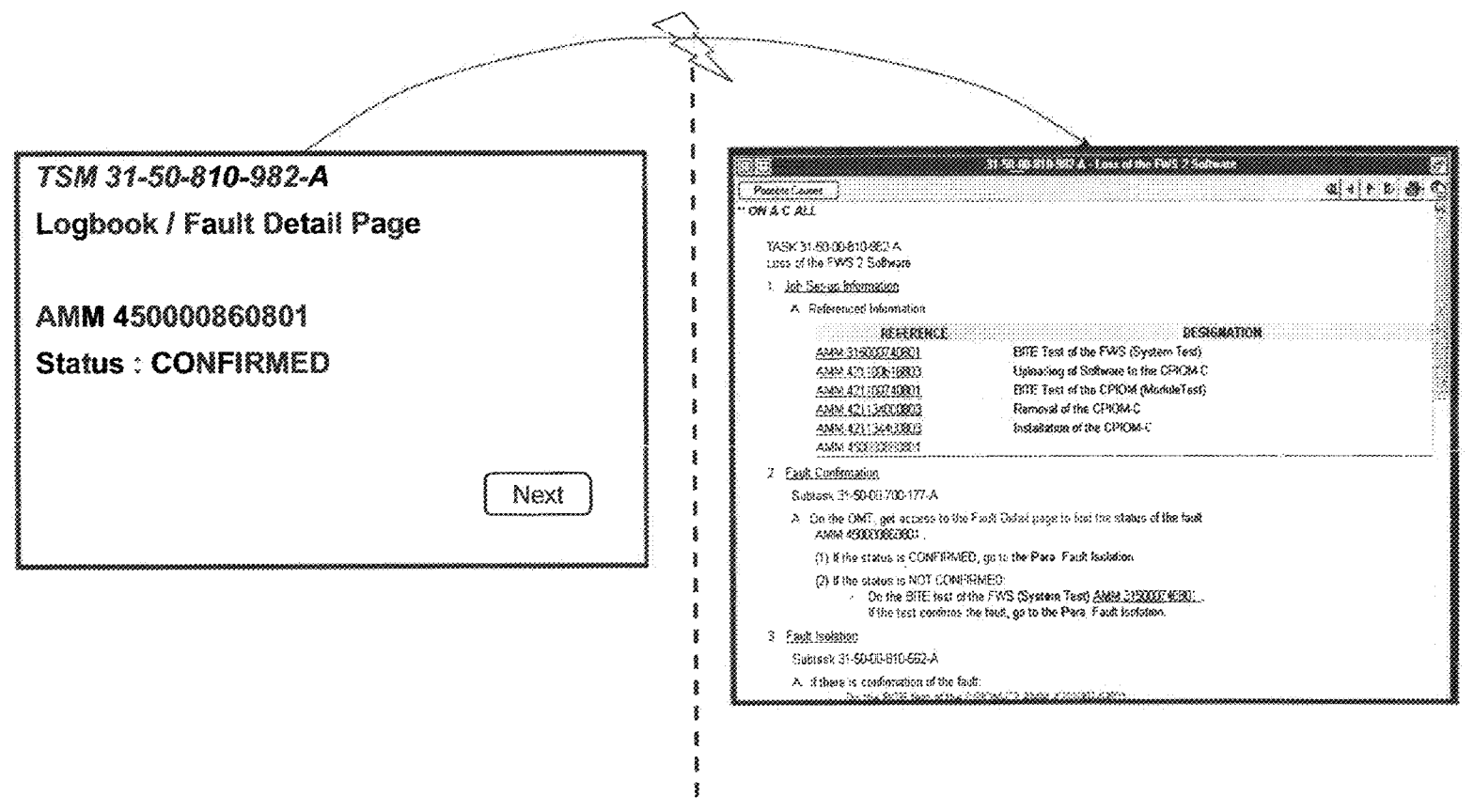

The root (410) of the fault-finding logic tree (400) is associated with a document page represented in the left part of FIG. 5A. This page indicates the main stages of the confirmation procedure and isolation of the fault. In 410, the fault-finding module tests the fault indicated in the flight logbook. In this present case, the status of the fault is confirmed (node 421) and so the fault-finding module passes on to node 441.

Figure 5B:
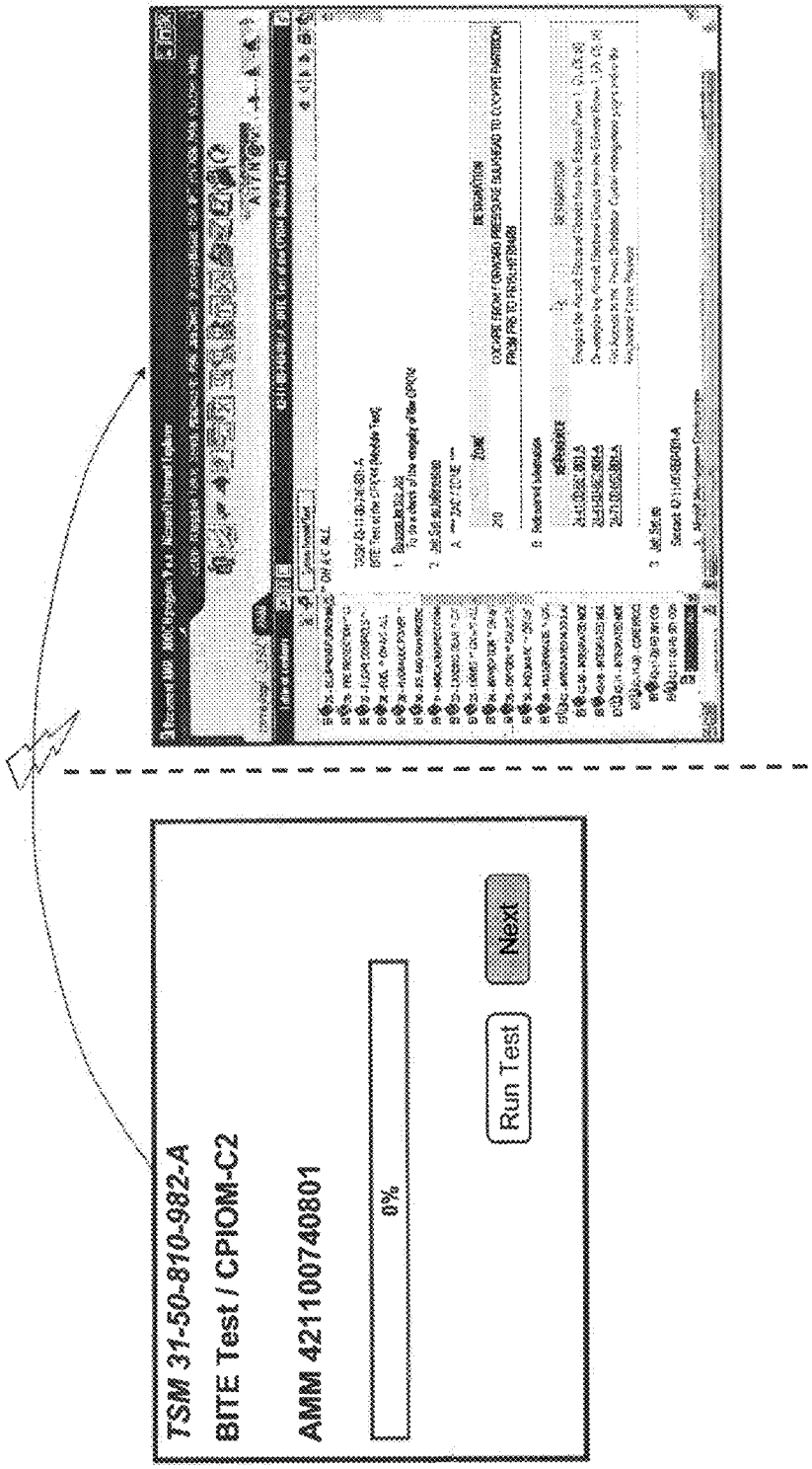

Node 441 is associated with the execution of a built-in test program (BITE) of a unit (LRU) of the FWS system called the CPIOM-C2 (Core Processing Input/Output Module). As illustrated in FIG. 5B, the screen of the OMT terminal indicates the degree of accomplishment of the test program, and the information screen gives the details of the corresponding procedure.

Figure 5C:
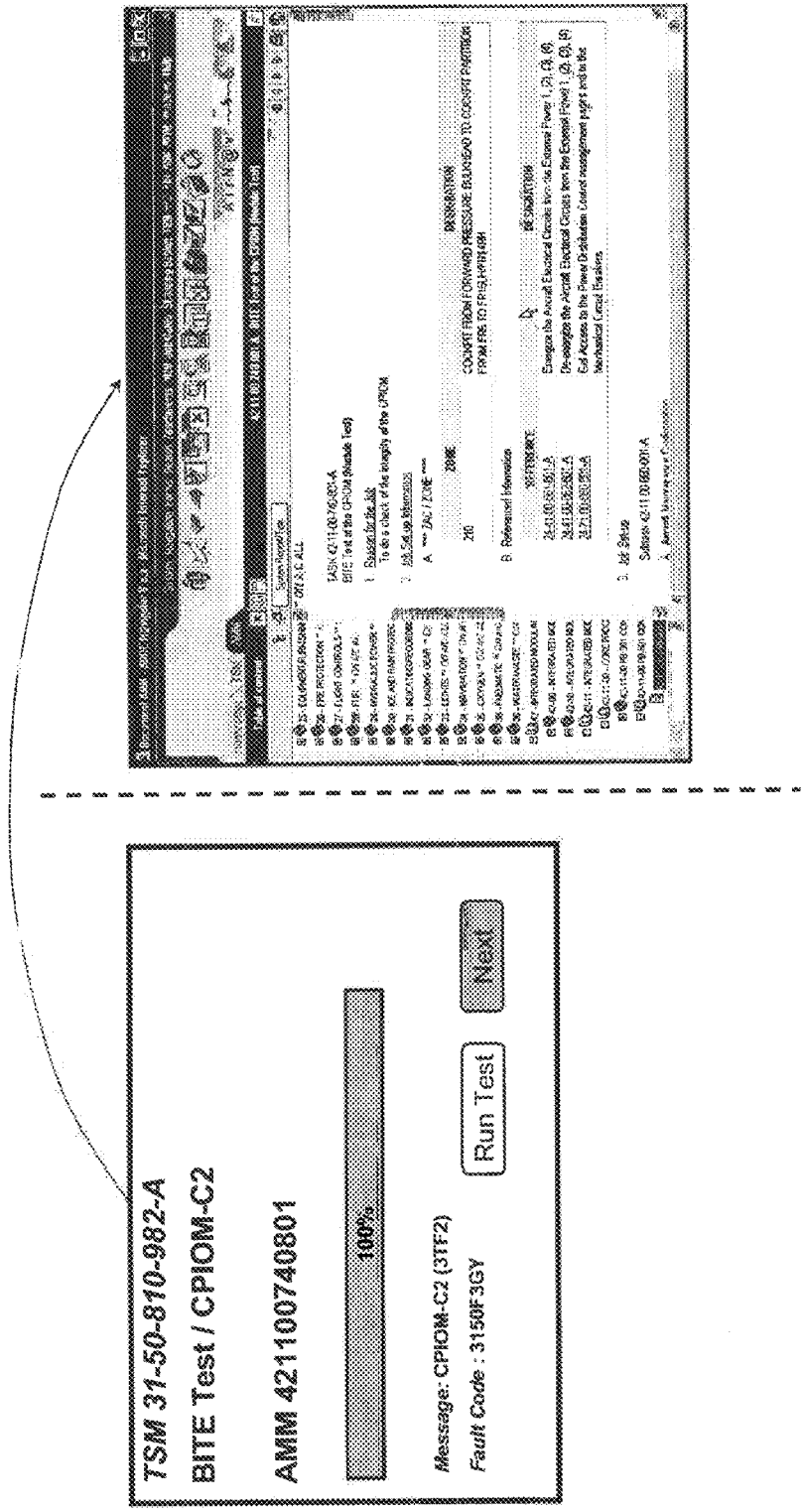

In this present case, on completion of the test, the program returns an error code as indicated on the screen of the OMT terminal in FIG. 5C. The fault on the CPIOM-C2 unit is therefore isolated (node 441 on the fault-finding logic tree). The document page remains unchanged at this stage.

Figure 5D:
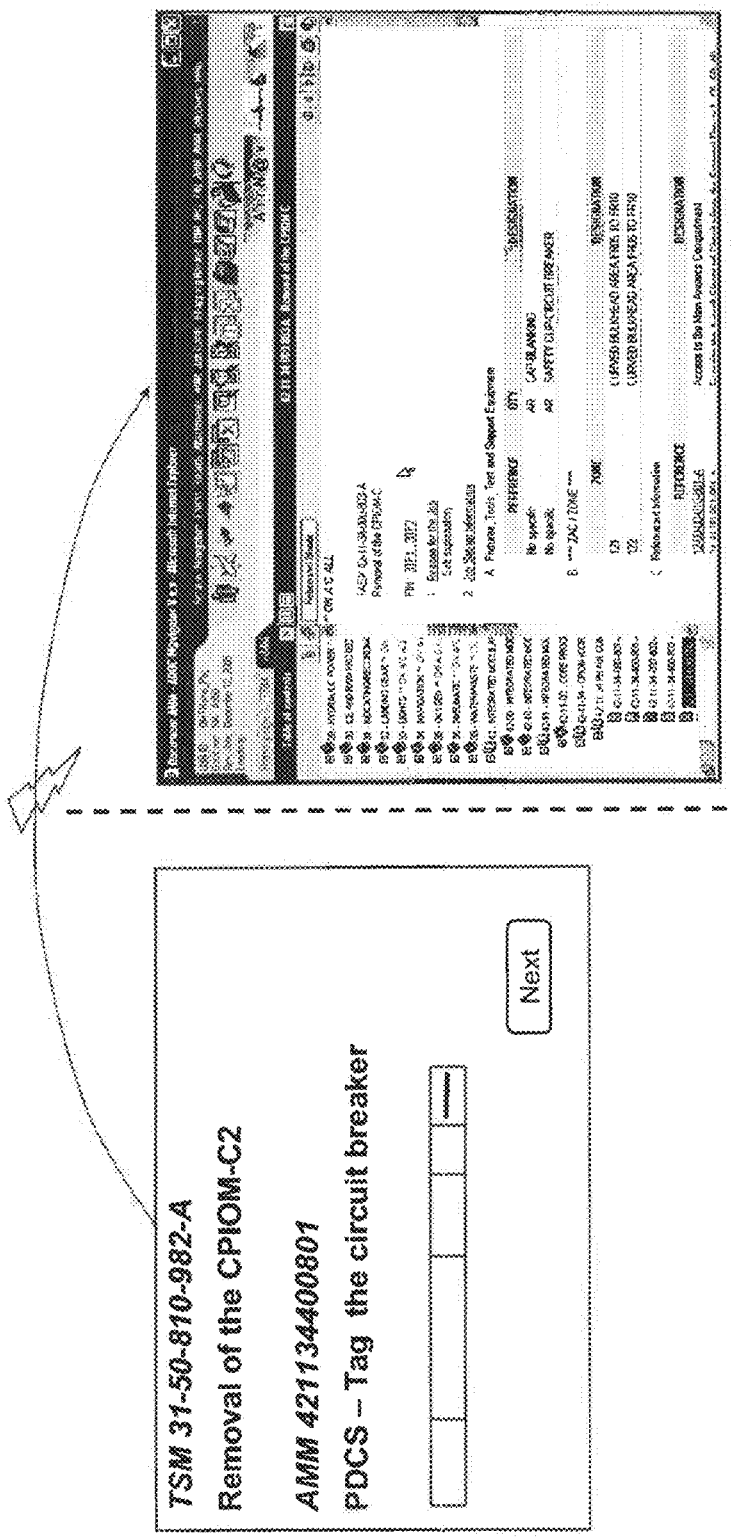
Figure 5E:
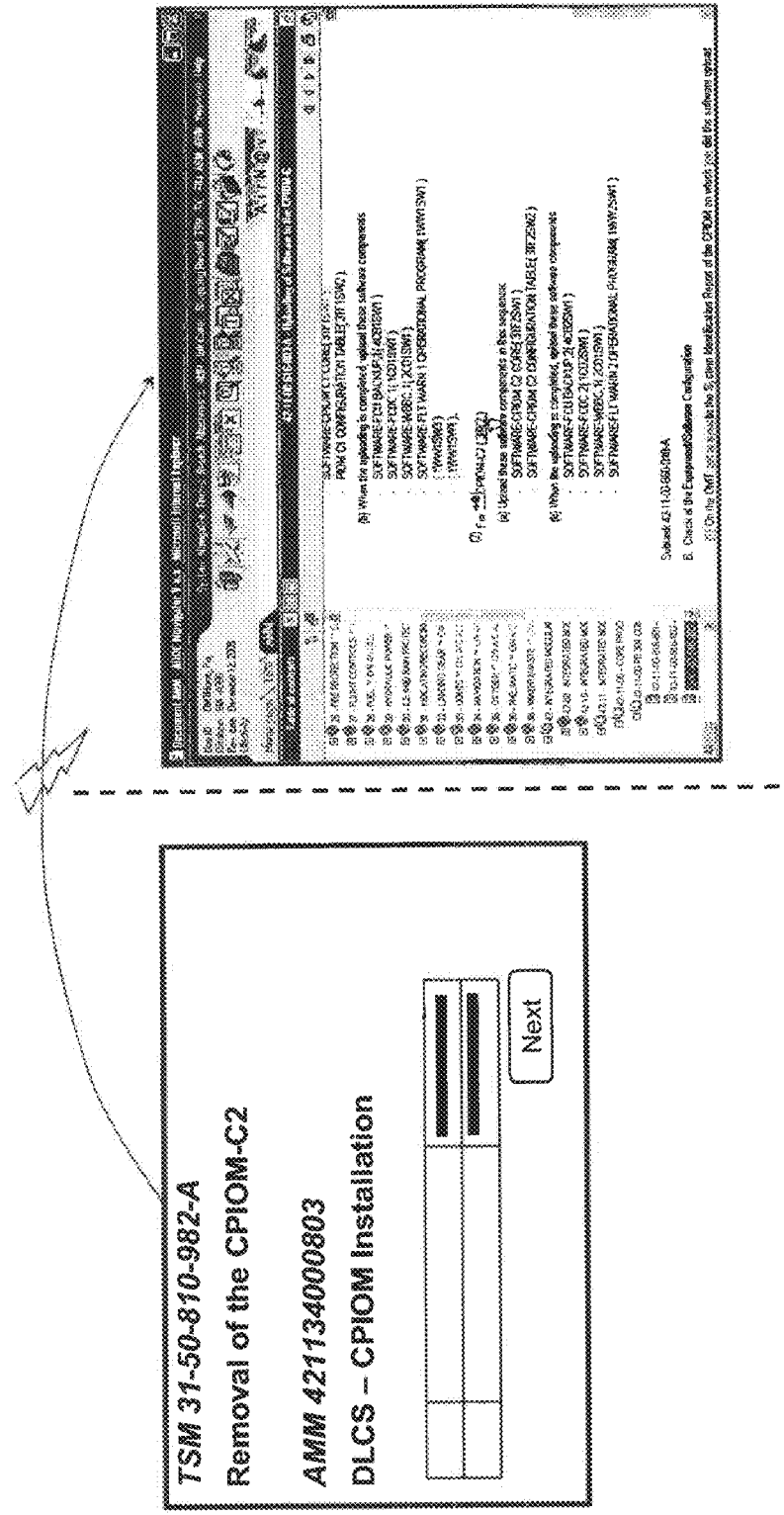
Figure 5F:
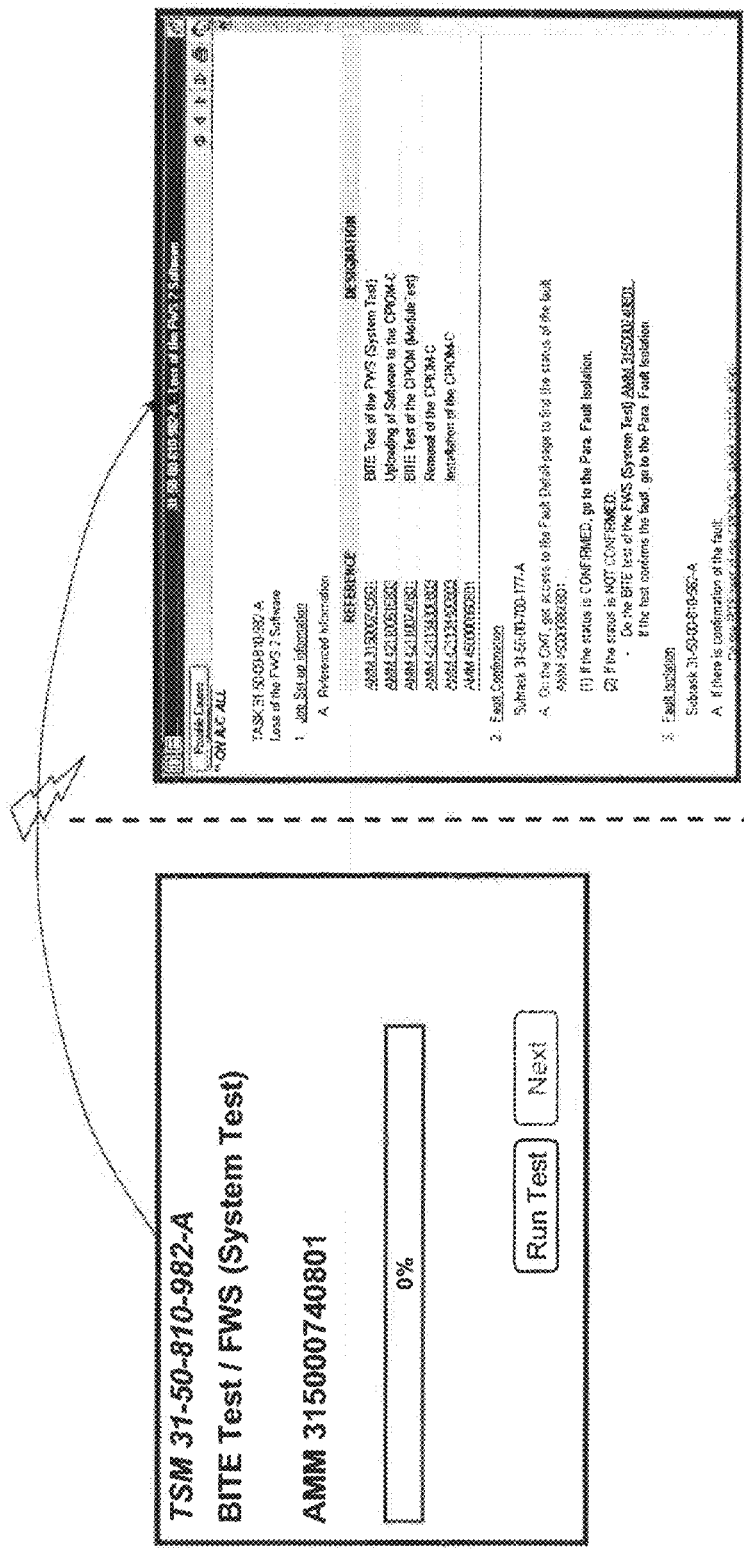
Figure 5G:
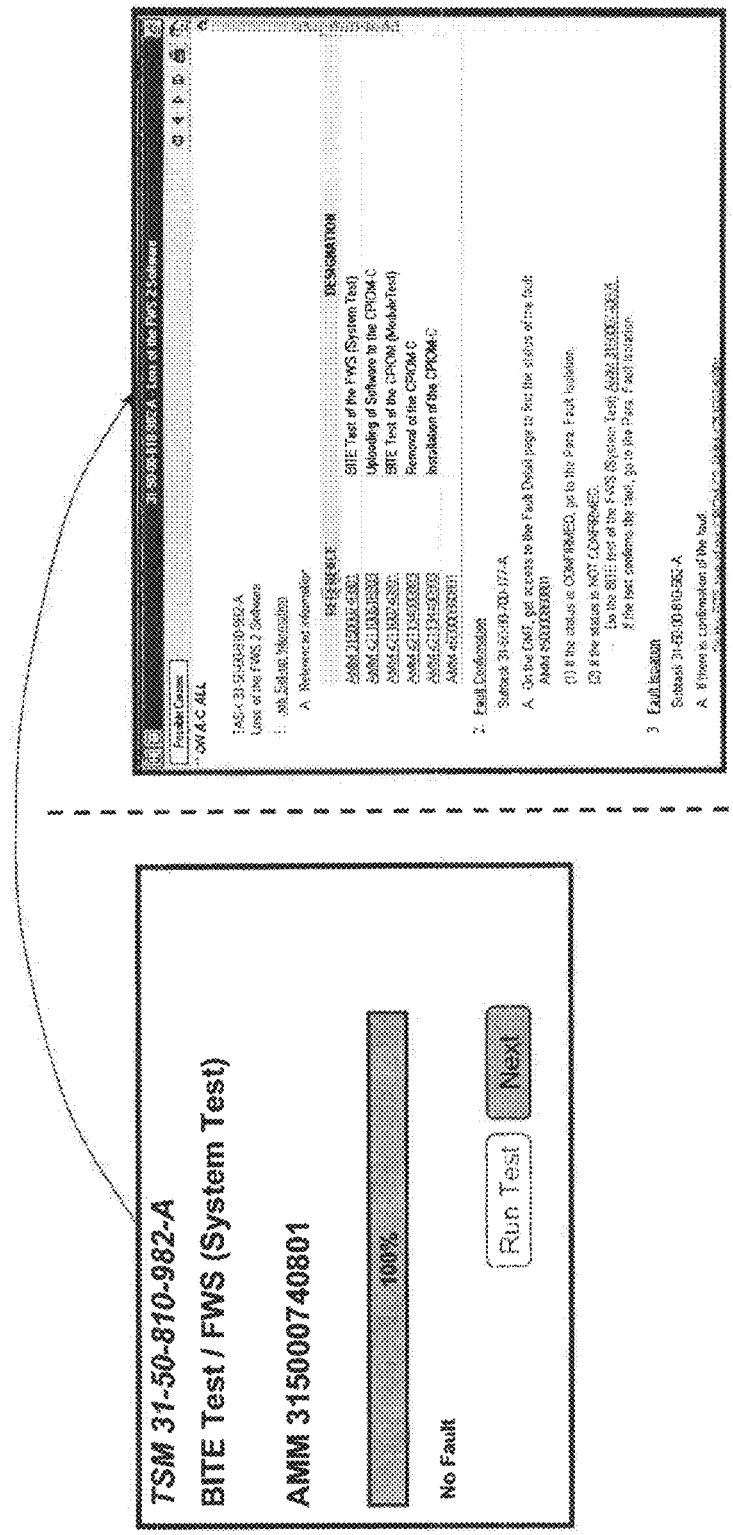

Node 451 corresponds to a procedure for replacement of the CPIOM-C2 unit, as illustrated in FIG. 5D, and the screen of the information terminal gives the details. In a first stage, the circuit-breaker of the power-supply circuit of the CPIOM-C2 unit is operated, or in other words, its power is cut, and then in a second stage (see FIG. 5E), a new unit is installed.

When the new unit has been installed and the power restored, the fault-finding module again tests the FWS system, meaning that it returns to the root (410) of the fault-finding logic tree. The test on the system this time proves satisfactory (absence of an error code), as indicated in FIG. 4G. The document page is naturally the same as that displayed during the first passage in the fault-finding logic tree.

The maintenance operator therefore concludes that the fault has been cleared and places the corresponding record in the flight logbook.

The invention claimed is:

1. A maintenance computer system for an aircraft, including a network that is partitioned into a secured avionics zone and an open zone, the system comprising:
   a first computer hosting a first software module, said first computer being accommodated in the avionics zone; and
   a second computer hosting a second software module, said second computer being accommodated in the open zone, and linked to the first computer via a unidirectional link going from the avionics zone to the open zone;
   the first software module configured to follow a fault-finding logic tree, and the second software module configured to present an electronic maintenance document and to automatically and synchronously generate a presentation of pages of the electronic maintenance document associated respectively with nodes of the tree when the first module follows a path along the fault-finding tree.

2. A computer system according to claim 1, wherein to each node of the fault-finding logic tree there corresponds at least one maintenance task and the first module transmits to the second module a hyperlink pointing to a page of the maintenance document associated with this task when the first module reaches the node.

3. A computer system according to claim 2, wherein for each node of the fault-finding logic tree, the first module determines the next node as a function of the result of executing the maintenance task corresponding to this node.

4. A computer system according to claim 1, wherein the fault-finding logic tree is determined from a fault identifier code, the code itself being obtained from analysis of an entry in an electronic flight logbook accommodated in the avionics zone.

5. A computer system according to claim 1, wherein, if the first module determines that an equipment item in the aircraft is faulty on completing its run through the fault-finding logic tree, the system is adapted to verify the presence of this equipment in a minimum equipment list (MEL) of the aircraft held in the avionics zone.

6. A computer system according to claim 5, wherein, if the faulty equipment item is present in the MEL, the system is adapted to calculate a corresponding cost in terms of loss of functional performance or safety margins of the aircraft.

7. A computer system according to claim 5, further comprising a third software module hosted by the first computer and a fourth software module, hosted by the second computer, the third module configured to seek and select elements of the MEL, and the fourth software module being configured to present document pages corresponding to the equipment so that the selection of an element by the third software module automatically and synchronously generates the presentation by the fourth module of a document.

8. A computer system according to claim 7, wherein, for each element of the MEL, the third module transmits to the fourth module, a hyperlink pointing to a URL containing the document page relating to this element.

9. A computer system according to claim 7, wherein the inputs/outputs of the first and second computers are linked to a KVM switch, with the switch configured to switch the inputs/outputs to a common input/output interface.

* * * * *